Aug. 10, 1937.  H. A. KNOX ET AL  2,089,210
TRACK FOR TRACK LAYING VEHICLES
Filed June 5, 1935
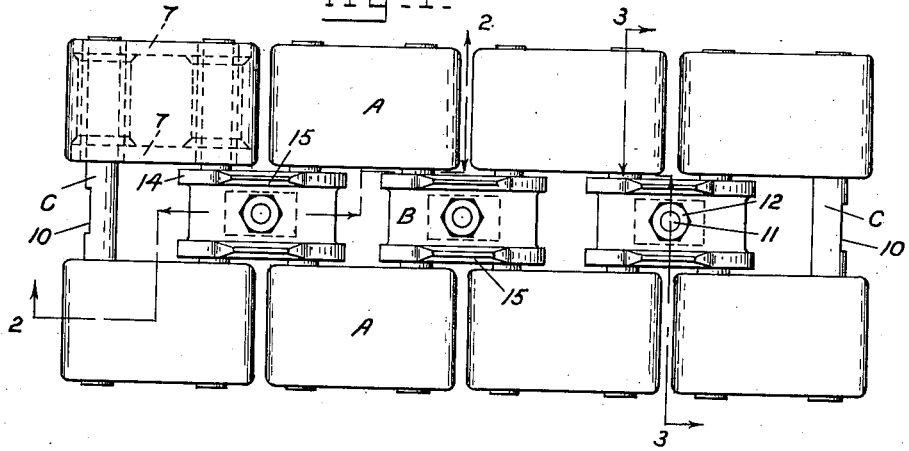
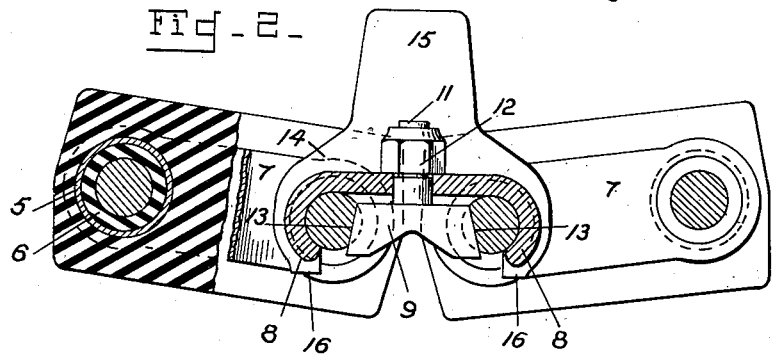
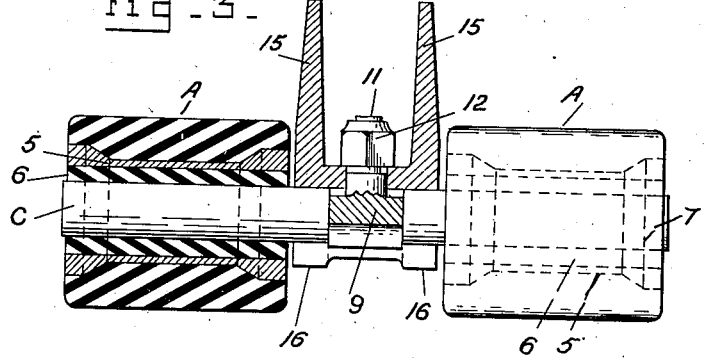
Inventors
Harry A. Knox
Richard H. Somers
By W. N. Roach
  Attorney Patented Aug. 10, 1937

2,089,210

UNITED STATES PATENT OFFICE 2,089,210

TRACK FOR TRACK LAYING VEHICLES

Harry A. Knox, Washington, D. C., and Richard H. Somers, United States Army, Mickleton, N. J.

Application June 5, 1935, Serial No. 25,092

2 Claims. (Cl. 305—10)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a track for track-laying vehicles.

The purpose of this invention is to provide an inexpensive and efficient link structure which may be easily and quickly applied to and removed from adjoining link pins of adjacent shoes.

A further object is to provide means for holding the link pins against independent rotational movement which will also serve to longitudinally space the shoes of the track.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of a track constructed in accordance with the invention.

Figs. 2 and 3 are sectional views on the corresponding lines of Fig. 1.

Referring to the drawing by characters of reference, the track comprises a double row of shoes A connected in spaced relation by links B mounted on link pins C.

The shoes are all identical and symmetrical and each consists of a block of rubber or similar material. The link pins C—C passing transversely through opposite ends of the block are arranged for a limited rotational displacement in any manner known to the art. One arrangement of this character is illustrated in which a metal bearing 5 fixed in the block A contains a rubber bushing 6 whose outer surface is fixed to the bearing and whose inner surface is fixed to the link pin C. In this example the two bearings in each block are rigidly connected by webs 7.

The links B which are identical, are disposed between the shoes A—A and each one is formed with turned ends 8—8 adapted to hook over the adjoining link pins of adjacent shoes. These turned ends are the sole means holding the adjacent shoes against longitudinal separation. A bolt insertable between the link pins has a wedge-shaped head 9 receivable in grooves 10 in the link pins. The shank 11 of the bolt passes through the link and receives a nut 12. This connection holds the link in place and locks the associated link pins against independent rotational movement.

The grooves 10 are formed perpendicularly to the plane containing the longitudinal axis of each link pin of a shoe so that it is immaterial if either one of adjacent shoes is reversed or turned about. The inclination of the opposite faces 13—13 of the wedge-shaped head determines the angular relation of assembly of adjacent shoes as shown in Fig. 2. The angle of assembly is about 7 to 8 degrees which is one-half the total angle of flection in passing around the wheels of the vehicle.

The turned ends 8 of the links constitute driving lugs for taking the drive from a sprocket wheel. Each side of the link is formed with a flange 14 which is centrally extended into an upstanding wheel guide 15. The flange also extends beyond the extremities of the turned ends and terminates in enlarged ends 16—16.

The assembly is effected by bringing adjacent shoes together, mounting one of the turned ends of a link on a link pin of one shoe and then rotating the link until it engages the link pin of the adjacent shoe. The bolt is then applied.

We claim:

1. In a track for track-laying vehicles, a series of laterally spaced pairs of shoes, a pair of link pins extending laterally through opposite ends of each pair of shoes and fixed against withdrawal therefrom, a link detachably engaging adjoining link pins of adjacent pairs of shoes at the portion of the pins between the laterally spaced pairs, and means carried by the link and engaging the pins to longitudinally space the pairs of shoes and hold the link pins against independent angular movement.

2. In a track for track-laying vehicles, a series of laterally spaced pairs of shoes, resilient bushings secured in opposite ends of the shoes, a pair of link pins extending laterally through opposite ends of each pair of shoes and fixedly secured in the bushings, a link detachably engaging adjoining link pins of adjacent pairs of shoes at that portion of the pins between the laterally spaced pairs, and means carried by the link and engaging the pins to longitudinally space the pairs of shoes.

HARRY A. KNOX.
RICHARD H. SOMERS.